(12) United States Patent
Tamura et al.

(10) Patent No.: US 9,852,008 B2
(45) Date of Patent: Dec. 26, 2017

(54) COMPUTER-READABLE RECORDING MEDIUM STORING EXECUTION INFORMATION NOTIFICATION PROGRAM, INFORMATION PROCESSING APPARATUS, AND INFORMATION PROCESSING SYSTEM

(71) Applicant: FUJITSU LIMITED, Kawasaki-shi, Kanagawa (JP)

(72) Inventors: Yuto Tamura, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 14/974,932

(22) Filed: Dec. 18, 2015

(65) Prior Publication Data

US 2016/0239331 A1  Aug. 18, 2016

(30) Foreign Application Priority Data

Feb. 17, 2015  (JP) ................... 2015-028415

(51) Int. Cl.
*G06F 9/50* (2006.01)
*G06F 9/455* (2006.01)
*G06F 9/54* (2006.01)

(52) U.S. Cl.
CPC .......... *G06F 9/505* (2013.01); *G06F 9/45537* (2013.01); *G06F 9/45558* (2013.01); *G06F 9/50* (2013.01); *G06F 9/544* (2013.01); *G06F 9/45533* (2013.01); *G06F 9/546* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 8,429,276 B1 * | 4/2013 | Kumar | G06F 9/45533 709/226 |
| 2002/0087611 A1 * | 7/2002 | Tanaka | G06F 9/5077 718/1 |
| 2009/0164399 A1 | 6/2009 | Bell, Jr. et al. | |
| 2010/0131957 A1 | 5/2010 | Kami | |
| 2014/0325511 A1 | 10/2014 | Aasheim | |

FOREIGN PATENT DOCUMENTS

| | | |
|---|---|---|
| JP | 2009-151774 | 7/2009 |
| JP | 2014-516192 | 7/2014 |
| WO | 2008-132924 | 11/2008 |
| WO | 2012/170746 | 12/2012 |

* cited by examiner

*Primary Examiner* — Qing Wu
(74) *Attorney, Agent, or Firm* — Fujitsu Patent Center

(57) ABSTRACT

An information processing apparatus includes a storage device and a processor that runs a virtual machine. The processor detects a waiting process that is ready for execution on the virtual machine, and writes process information about the detected waiting process in a storage area of the storage device, which is accessible area to management software managing the virtual machine.

6 Claims, 15 Drawing Sheets

PARAMETER STORAGE UNIT — 124

TIME ESTIMATE TABLE — 126

| PROCESS ID | AVERAGE TIME |
|---|---|
| P00 | T0 µs / STEP |
| P01 | T1 µs / STEP |
| P02 | T2 µs / STEP |
| P03 | T3 µs / STEP |

COLLECTED INFORMATION STORAGE UNIT

PROCESS INFORMATION TABLE 143

| VIRTUAL MACHINE ID | PROCESS COUNT | ESTIMATED MAXIMUM WAITING TIME |
|---|---|---|
| VM00 | C0 | $T2 \times C0$ μs |
| VM01 | C1 | $T1 \times C1$ μs |

FIG. 10

COMPUTER-READABLE RECORDING MEDIUM STORING EXECUTION INFORMATION NOTIFICATION PROGRAM, INFORMATION PROCESSING APPARATUS, AND INFORMATION PROCESSING SYSTEM

CROSS-REFERENCE TO RELATED APPLICATION

This application is based upon and claims the benefit of priority of the prior Japanese Patent Application No. 2015-028415, filed on Feb. 17, 2015, the entire contents of which are incorporated herein by reference.

FIELD

The embodiments discussed herein relate to a computer-readable recording medium storing an execution information notification program, an information processing apparatus, and an information processing system.

BACKGROUND

Virtualization technologies have been used to allow a plurality of virtual computers (may be called virtual machines (VMs)) to run on a physical computer (may be called a physical machine). Using different virtual machines makes it possible to execute an information processing task and another information processing task separately so as not to cause any interference with each other. Therefore, even if virtual machines for individual users are configured on the same physical computer, information processing tasks for the individual users may be executed separately.

A physical machine runs management software to manage virtual machines. Such management software includes a virtual machine monitor (VMM), hypervisor, and management Operating System (OS). The management software allocates physical hardware resources that the physical machine has, such as Central Processing Unit (CPU) cores or Random Access Memory (RAM) space, to the virtual machines placed on the physical machine. Each virtual machine executes an OS for a user (may be called a guest OS or a user OS), independently of the other virtual machines. The OS of each virtual machine schedules processes started on the OS so as to perform the processes within resources allocated by the management software.

For the resource allocation, there has been proposed a virtual machine system in which resources are dynamically allocated to virtual machines. In this proposed virtual machine system, each virtual machine issues a resource request to management software. The management software performs an optimization operation on the basis of the resource requests received from the plurality of virtual machines, and allocates resources to each virtual machine. The management software gives resource allocation information indicating the allocation result to each virtual machine. Continual exchange of resource requests and resource allocation information between the plurality of virtual machines and the management software achieves dynamic resource allocation to each virtual machine.

Further, a data processing system including a processor (multi-core processor) equipped with a plurality of cores has been proposed. In this proposed data processing system, an OS or hypervisor learns the execution characteristics of a thread and generates thread performance data. When the thread is executed again thereafter, the OS assigns the thread to a core that is expected to execute the thread most efficiently among the plurality of cores, on the basis of the thread performance data.

Still further, a heterogeneous processing system including a plurality of cores having different power capabilities has been proposed. In this proposed heterogeneous processing system, a hypervisor presents virtual cores through virtualization, and allocates virtual cores to an OS. When receiving a scheduling request for executing a thread on a virtual core from the OS, the hypervisor selects a core on which to execute the thread and schedules the thread for the selected core. This enables the hypervisor to hide differences in power capabilities among the cores from the OS.

Please see, for example, International Publication Pamphlet No. 2008/132924, Japanese Laid-open Patent Publication No. 2009-151774, and International Publication Pamphlet No. 2012/170746.

Management software may dynamically adjust the allocation of resources to virtual machines according to the loads of the virtual machines. To achieve this dynamic resource allocation, the management software continuously obtains information on the loads of the virtual machines therefrom. However, if the management software and the individual virtual machines do not perform communication efficiently and a high communication overhead is incurred, a long time lag exists between a load change in a virtual machine and a change in the allocation of resources, which results in a failure in fully satisfying demands of the virtual machine.

For example, there is a method for communication between the management software and the virtual machines using "interrupt". However, the "interrupt" needs an interrupted CPU resource to perform preprocessing that includes activating an interrupt handler and saving a processing state existing just before the interrupt, and then to call a routine for intended process including a load research. Therefore, the interrupt handler has a high overhead, which in turn causes a longer delay in communication. As a result, even if the load of a virtual machine rapidly increases, the amount of resources allocated to the virtual machine may not increase for some time, and thus an overload state may continue.

SUMMARY

According to one aspect, there is provided a non-transitory computer-readable storage medium storing a computer program that causes a computer to perform a procedure including: detecting a waiting process on a virtual machine running on the computer, the waiting process being ready for execution; and writing process information about the detected waiting process in a storage area of a storage device provided in the computer, the storage area being accessible to management software managing the virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of allocation of

FIG. 9 illustrates an example of a time estimate table;

FIG. 10 illustrates an example of a process information table;

DESCRIPTION OF EMBODIMENTS

Figure 1:
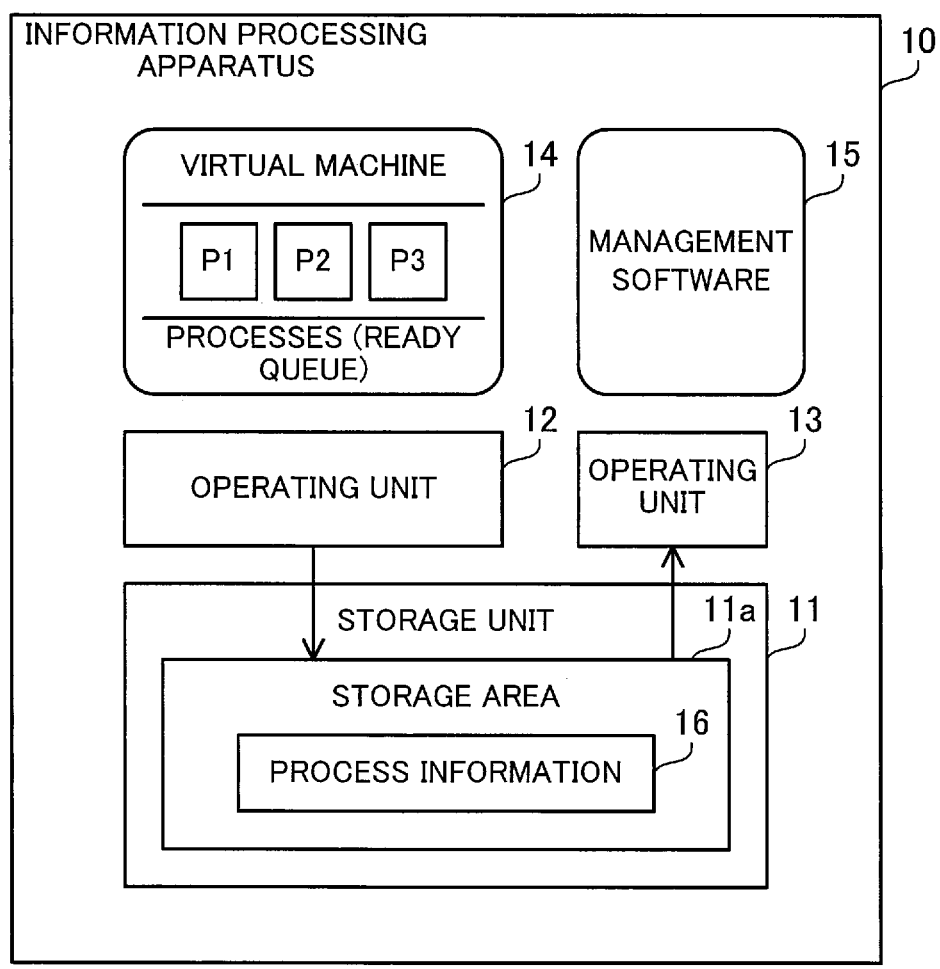
FIG. 1 illustrates an information processing apparatus according to a first embodiment.

Several embodiments will be described below with reference to the accompanying drawings, wherein like reference numerals refer to like elements throughout.

(First Embodiment)

FIG. 1 illustrates an information processing apparatus according to a first embodiment.

An information processing apparatus 10 of the first embodiment is a computer (physical machine) that is able to run one or more virtual machines with a virtualization technology. The information processing apparatus 10 includes a storage unit 11 and operating units 12 and 13. In this connection, these operating units 12 and 13 may be implemented on different chassis or different physical machines connected over a network. In this case, the information processing apparatus 10 may be called an information processing system.

The storage unit 11 is a shared storage device (for example, a shared memory) that is accessed from the operating units 12 and 13. The storage unit 11 stores programs to be executed by the operating units 12 and 13 and data to be used in the programs. The storage unit 11 is a RAM or another volatile semiconductor memory, for example. Alternatively, the storage unit 11 may be a flash memory, a Hard Disk Drive (HDD), or another non-volatile storage device.

The operating unit 12 (first operating unit) runs a virtual machine 14. The operating unit 13 (second operating unit) executes management software 15 to manage the virtual machine 14. In this connection, the virtual machine 14 and management software 15 may be executed on the same operating unit. Each of the operating units 12 and 13 is a CPU, a set of two or more CPUs, a CPU core, a set of two or more CPU cores, or the like. The operating units 12 and 13 may be called CPU resources. The operating units 12 and 13 execute programs stored in the storage unit 11. In this connection, the operating units 12 and 13 may include Digital Signal Processor (DSP) or other kinds of processors, or may include Application Specific Integrated Circuit (ASIC), Field Programmable Gate Array (FPGA), or other application-specific electronic circuits. A set of a plurality of processors (multiprocessor) may be called a "processor".

The virtual machine 14 executes an OS. The virtual machine 14 executes the OS independently of the other virtual machines running on the information processing apparatus 10. This enables these virtual machines to perform information processing separately. The operating unit 12 is assigned to the virtual machine 14 by the management software 15. The OS of the virtual machine 14 schedules processes started on the OS, according to the assigned operating unit 12, which is a resource. In this connection, processes of application software, processes of device drivers, and other processes are started on an OS.

In the scheduling of processes, the OS of the virtual machine 14 manages a ready queue in which waiting processes, which are ready for execution, are placed. The OS of the virtual machine 14 determines which process to execute next from among the processes placed in the ready queue, according to a predetermined scheduling algorithm. In the case of a First-In-First-Out (FIFO) algorithm, for example, the process at the beginning of the ready queue is extracted and executed each time a process currently being executed is completed. In the case of a preemptive algorithm, when a time period assigned to a process currently being executed expires, the process is interrupted and placed at the end of the ready queue, and then the process at the beginning of the ready queue is extracted and executed. Referring to the example of FIG. 1, processes P1, P2, and P3 are placed in the ready queue of the virtual machine 14.

The management software 15 allocates some of the physical hardware resources that the information processing apparatus 10 has, to the virtual machine 14. The operating unit 12 is currently allocated to the virtual machine 14. In addition, the management software 15 dynamically adjusts the allocation of resources to the virtual machine 14 according to the load of the virtual machine 14. For example, the management software 15 allocates more resources to the virtual machine 14 if the load thereof has increased, and reduces the resources allocated to the virtual machine 14 if the load thereof has decreased. In this connection, when other virtual machines run on the information processing apparatus 10, the management software 15 may determine which resources to allocate to the virtual machine 14, taking into consideration the load of other virtual machines.

In order for the management software 15 to confirm the load of the virtual machine 14, the following communication is performed. The operating unit 12 detects waiting processes (for example, processes P1, P2, and P3) of the virtual machine 14, For example, such waiting processes are detected with reference to information managed by the OS of the virtual machine 14. The operating unit 12 writes process information 16 about the detected processes in a storage area 11a of the storage unit 11. The storage area 11a is accessible to the management software 15, and is, for example, reserved by the management software 15 in the storage unit 11. The management software 15 may notify the virtual machine 14 of the location of the storage area 11a in advance.

The process information 16 may indicate the number of detected waiting processes. For example, if the processes P1, P2, and P3 are placed in the ready queue, the number of waiting processes is three. The process information 16 may also indicate an expected value of waiting time needed to execute a detected process (for example, the maximum waiting time if there are a plurality of waiting processes). For example, such a waiting time that is needed to execute the process placed at the end of a ready queue is expected based on the number of waiting processes and the past execution state of the process at the end of the ready queue. For example, the operating unit detects waiting processes and writes the process information 16 each time the OS of the virtual machine 14 schedules processes.

The operating unit 13 monitors the storage area 11*a* of the storage unit 11. For example, the operating unit periodically accesses the storage area 11*a* using a polling scheme. When detecting the process information 16 from the storage area 11*a*, the operating unit 13 adjusts the allocation of resources to the virtual machine 14 on the basis of the detected process information 16. In the case where other virtual machines run on the information processing apparatus 10, the operating unit 13 may identify a virtual machine corresponding to the process information 16 in the following manner. For example, the operating unit 13 reserves a storage area for each virtual machine in the storage unit 11. This enables the operating unit 13 to determine that the process information 16 stored in the storage area 11*a* corresponds to the virtual machine 14. Alternatively, for example, the operating unit 12 may add the identification information of the virtual machine 14 to the process information 16.

According to the first embodiment, the information processing apparatus 10 detects the waiting processes of the virtual machine 14, and writes process information 16 about the waiting processes in the storage area 11*a*, which is accessible to the management software 15. When the management software 15, which monitors the storage area 11*a*, detects the process information 16 from the storage area 11*a*, the management software 15 adjusts the allocation of resources to the virtual machine 14 on the basis of the process information 16. This approach makes it possible to streamline the communication between the virtual machine 14 and the management software 15, and to allocate resources to the virtual machine 14 according to the load of the virtual machine 14 immediately.

By the way, in the case where the management software 15 obtains load information from the virtual machine 14 using "interrupt", an interrupt handler is activated before intended process, which incurs a higher communication overhead. Therefore, a long time lag exists between a load change in the virtual machine 14 and a change in the allocation of resources according to the load change. In contrast, the method of the first embodiment makes it possible to reduce a communication overhead, compared with the method using interrupts, and to allow the management software 15 to confirm a load change in the virtual machine 14 immediately. As a result, it becomes possible to deal with the load change, such as to allocate more resources to the virtual machine 14 immediately when the load of the virtual machine 14 rapidly increases.

(Second Embodiment)

A second embodiment will now be described.

Figure 2:
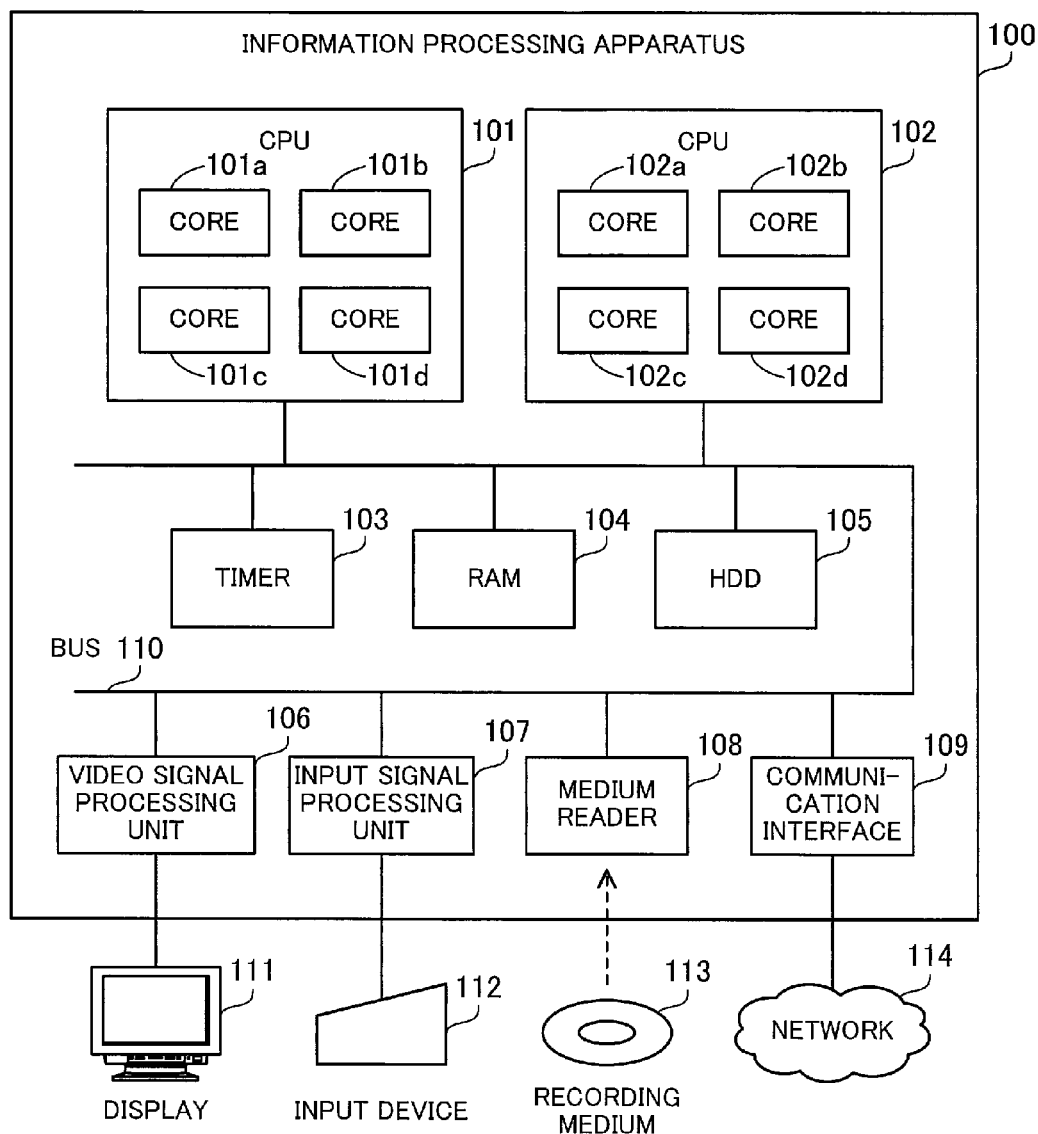
FIG. 2 is a block diagram illustrating an exemplary hardware configuration of an information processing apparatus.

FIG. 2 is a block diagram illustrating an exemplary hardware configuration of an information processing apparatus.

An information processing apparatus 100 of the second embodiment allows a plurality of virtual machines to run thereon. The information processing apparatus 100 may be a terminal device, a client device, a client computer, or another. Alternatively, the information processing apparatus 100 may be a server apparatus, a server computer, a host computer, or another. The information processing apparatus 100 includes CPUs 101 and 102, a timer 103, a RAM 104, an HDD 105, a video signal processing unit 106, an input signal processing unit 107, a medium reader 108, and a communication interface 109. These units are connected with a bus 110.

The CPUs 101 and 102 are processor packages that execute programs. The CPUs 101 and 102 each load at least part of programs from the HDD 105 to the RAM 104 and execute it. The CPU 101 includes cores 101*a*, 101*b*, 101*c*, and 101*d*, whereas the CPU 102 includes cores 102*a*, 102*b*, 102*c*, and 102*d*. These cores 101*a*, 101*b*, 101*c*, 101*d*, 102*a*, 102*b*, 102*c*, and 102*d* are able to execute instructions of programs in parallel. In this connection, a single CPU and a single core may be called a "processor". A set of two or more CPUs or a set of two or more cores may be called a "multiprocessor" or a "processor".

The timer 103 is hardware that makes a notification when a specified time period expires. When receiving a timer request specifying a time period from any core, the timer 103 starts to count down the specified time period (or to count up from zero). When the remaining time period becomes zero (or when the counter indicates a value equal to the specified time period), the timer 103 sends a timer interrupt signal to the core that has made the timer request. In this connection, hardware equivalent to the timer 103 may be provided in each CPU or each core.

The RAM 104 is a shared memory that is accessible to the cores 101*a*, 101*b*, 101*c*, 101*d*, 102*a*, 102*b*, 102*c*, and 102*d*. The RAM 104 temporarily stores programs and data. Another type of memory than the RAM or a plurality of memories may be provided in the information processing apparatus 100.

The HDD 105 is a non-volatile storage device for storing various software programs, such as OS, device driver, or application software, and data. Another type of storage device, such as a flash memory or a Solid State Drive (SSD), or a plurality of non-volatile storage devices may be provided in the information processing apparatus 100.

The video signal processing unit 106 outputs images to a display 111 connected to the information processing apparatus 100 in accordance with instructions from the cores 101*a*, 101*b*, 101*c*, 101*d*, 102*a*, 102*b*, 102*c*, and 102*d*. As the display 111, a Cathode Ray Tube (CRT) display, a Liquid Crystal Display (LCD), a Plasma Display panel (PDP), an Organic Electro-Luminescence (OEL) display, or anther may be used.

The input signal processing unit 107 obtains an input signal from an input device 112 connected to the information processing apparatus 100, and outputs the input signal to a core. As the input device 112, a pointing device, such as a mouse, touch panel, touchpad, or trackball, a keyboard, a remote controller, or a button switch may be used. In addition, plural types of input devices may be connected to the information processing apparatus 100.

The medium reader 108 is a driving device that reads programs and data from a recording medium 113. For example, as the recording medium 113, a magnetic disk, such as a Flexible Disk (FD) or an HDD, an optical disc, such as a Compact Disc (CD) or a Digital Versatile Disc (DVD), a Magneto-Optical disk (MO), or a semiconductor memory may be used. The medium reader 108 stores programs and data read from the recording medium 113 in the RAM 104 or HDD 105.

The communication interface 109 is connected to a network 114 and communicates with other information processing apparatuses over the network 114. The communication interface 109 may be a wired communication interface that is connected to a communication device, such as a switch or router, with a cable, or a wireless communication interface that is connected to a radio base station.

In this connection, the information processing apparatus 100 may be configured without the medium reader 108. Further, the information processing apparatus 100 may be configured without the video signal processing unit 106 or the input signal processing unit 107 if the information processing apparatus 100 is controlled from a user terminal device over the network 114. Still further, the display 111 and input device 112 may be integrated into the chassis of the information processing apparatus 100. Note that the RAM 104 is an example of the storage unit 11 of the first embodiment, the core 101a is an example of the operating unit 12 of the first embodiment, and the core 102a is an example of the operating unit 13 of the second embodiment.

Figure 3:
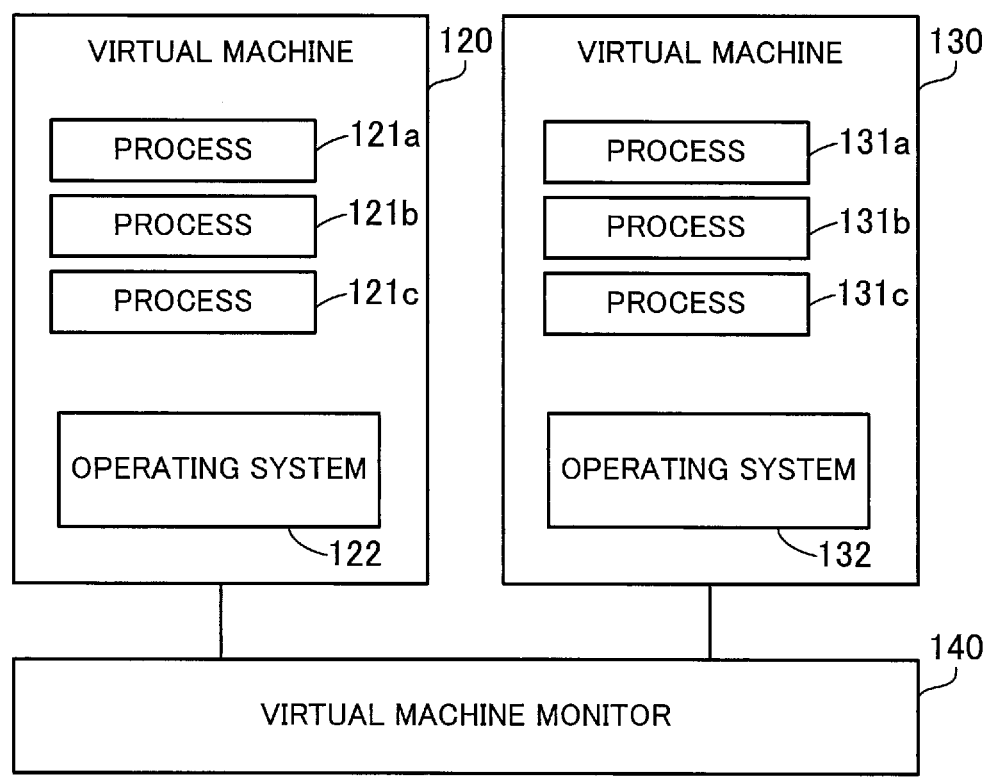
FIG. 3 is a block diagram illustrating an exemplary virtualization architecture.

FIG. 3 is a block diagram illustrating an exemplary virtualization architecture.

The information processing apparatus 100 includes virtual machines 120 and 130 and a virtual machine monitor 140. The virtual machines 120 and 130 are virtual computers implemented with a virtualization technology. The virtual machine monitor 140 manages the virtual machines 120 and 130. The virtual machine monitor 140 may be called a hypervisor. The virtual machine monitor 140 may be implemented by one or more cores executing programs, for example. In this connection, the virtual machine 120 and virtual machine monitor 140 are an example of the virtual machine 14 and management software 15 of the first embodiment, respectively.

The virtual machine monitor 140 allocates physical hardware resources that the information processing apparatus 100 has, to the virtual machines 120 and 130. The resources that are allocated to the virtual machines 120 and 130 include CPU resources, which are computing power of the CPUs 101 and 102, and RAM resources, which are storage areas of the RAM 104. In addition to these, HDD resources, which are storage areas of the HDD 105, and communication resources, which are bands of the communication interface 109, may be allocated to the virtual machines 120 and 130. In the second embodiment, CPU resources are mainly considered as resources. In addition, assume that, basically, CPU resources are allocated to the virtual machines 120 and 130 on a per-core basis. In this connection, it is also possible to divide the operating time of a core into time zones and to allocate the core to different virtual machines for different time zones.

The virtual machine 120 includes processes 121a, 121b, and 121c and an operating system 122. The processes 121a, 121b, and 121c are units of execution within processing started on the operating system 122. The processes 121a, 121b, and 121c are executed in accordance with an application program, for example.

The operating system 122 controls the virtual machine 120. The operating system 122 recognizes only resources allocated by the virtual machine monitor 140, as resources that the information processing apparatus 100 has. Then, the operating system 122 schedules the processes 121a, 121b, and 121c such as to execute these processes 121a, 121b, and 121c with the allocated resources in a time-division fashion.

The operating system 122 places the processes 121a, 121b, and 121c in a ready queue to manage them as waiting processes. Each time a process currently being executed is interrupted or completed, the operating system 122 selects and executes the process with the highest priority from among the waiting processes. For process scheduling, a predetermined scheduling algorithm is employed, such as a FIFO or a preemptive algorithm. In the case of the FIFO algorithm, the operating system 122 waits for the completion of a process currently being executed, and when the process is completed, extracts and executes one waiting process placed at the beginning of the ready queue. In the case of the preemptive algorithm, when a predetermined time period assigned to a process currently being executed expires, the operating system 122 interrupts and places the process at the end of the ready queue, and then extracts and executes one waiting process placed at the beginning of the ready queue.

The virtual machine 130 includes processes 131a, 131b, and 131c and an operating system 132. The virtual machine monitor 140 allocates different resources to the virtual machines 120 and 130, so that these virtual machines 120 and 130 perform information processing separately without causing any interference with each other. Therefore, the virtual machines 120 and 130 may be activated by different users. The processes 131a, 131b, and 131c correspond to the processes 121a, 121b, and 121c of the virtual machine 120. The operating system 132 corresponds to the operating system 122 of the virtual machine 120.

Figure 4:
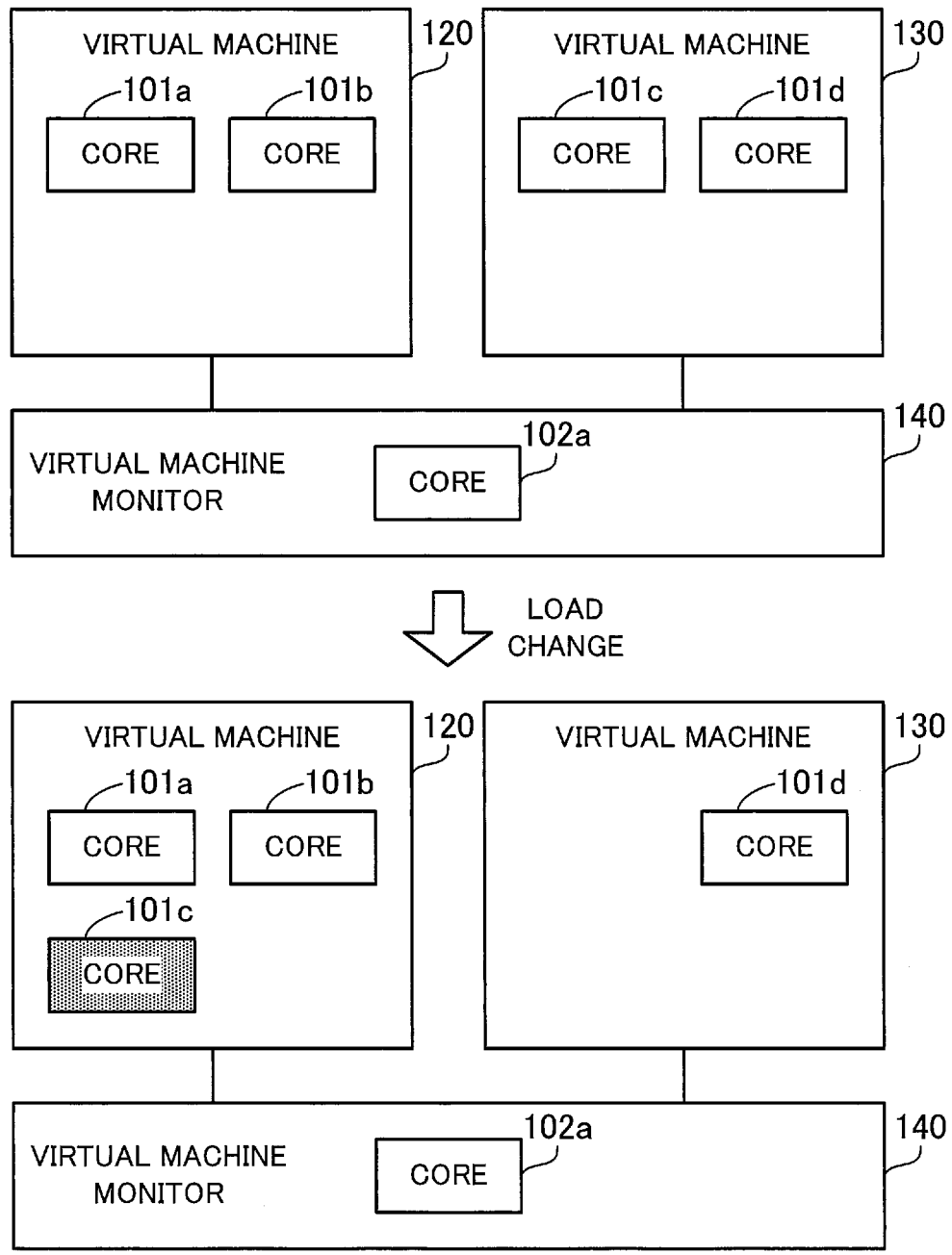

FIG. 4 illustrates an example of allocation of CPU resources.

One or more cores are allocated as CPU resources to each virtual machine 120, 130. In addition, the virtual machine monitor 140 uses at least one core. For example, the cores 101a and 101b of the CPU 101 are allocated to the virtual machine 120, whereas the cores 101c and 101d of the CPU 101 are allocated to the virtual machine 130. The virtual machine monitor 140 uses the core 102a of the CPU 102.

The virtual machine monitor 140 monitors the loads of the virtual machines 120 and 130, and dynamically adjusts the allocation of resources to the virtual machines 120 and 130 according to the loads. As indexes indicating the load of a virtual machine 120, 130, the number of waiting processes and an estimated value of waiting time (estimated maximum waiting time) needed to start the process at the end of a ready queue may be used, as will be described later. It is recognized that more waiting processes or a longer estimated maximum waiting time in a virtual machine indicates a higher load.

The virtual machine monitor 140 determines which resources to allocate to each virtual machine, on the basis of the relative loads among a plurality of virtual machines. Especially, the virtual machine monitor 140 increases the CPU resources of a virtual machine with relatively higher load, and reduces the CPU resources of a virtual machine with relatively smaller load. For example, assume that the load of the virtual machine 120 increases and the load of the virtual machine 130 decreases. In this case, for example, the virtual machine monitor 140 allocates the cores 101a, 101b, and 101c to the virtual machine 120 to increase the number of cores used by the virtual machine 120. In addition, the virtual machine monitor 140 allocates the core 101d to the virtual machine 130 to decrease the number of cores used by the virtual machine 130.

The following describes how the virtual machine monitor 140 monitors the loads of the virtual machines 120 and 130. The following describes a first method in which the virtual machine monitor 140 periodically collects load information from the virtual machines 120 and 130 using interrupts, and a second method in which the virtual machines 120 and 130 directly write process information in a specified storage area of the RAM 104.

Figure 5:
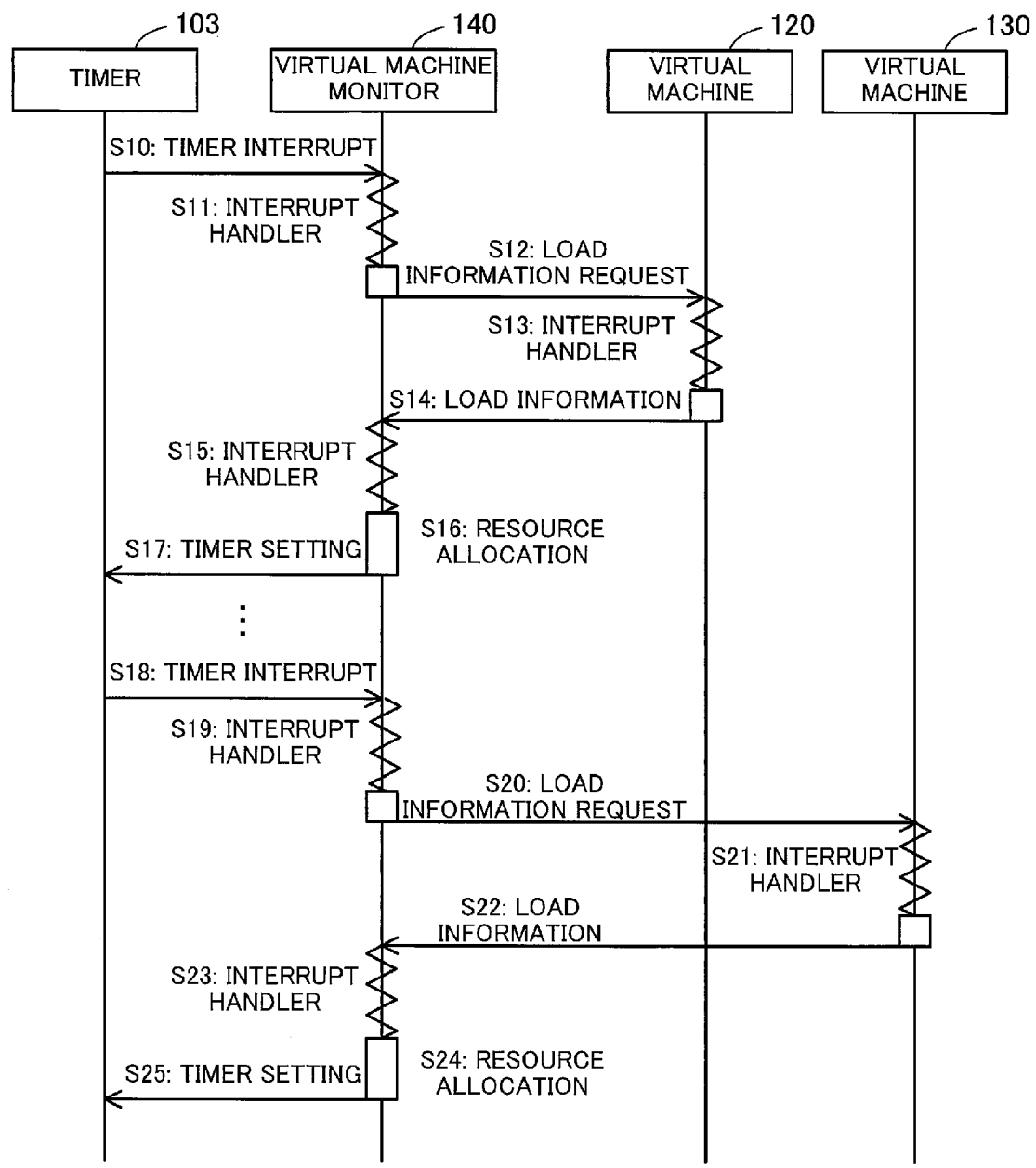
FIG. 5 is a sequence diagram illustrating a first exemplary flow of resource allocation.

FIG. 5 is a sequence diagram illustrating a first exemplary flow of resource allocation.

In the first method, the timer 103 is set for a time period for collection of load information. When the specified time period expires, the timer 103 issues a timer interrupt to the virtual machine monitor 140 (S10). When receiving the timer interrupt, the virtual machine monitor 140 executes an interrupt handler corresponding to the timer interrupt (S11). The interrupt handler is a program module that is prepared for each type of interrupt. The interrupt handler saves the state of the core 102a existing immediately before the interrupt, in the RAM 104, and calls a desired program module. That is, a context switch occurs in the core 102a.

When the context switch is complete, the virtual machine monitor 140 sends a load information request to the virtual machine 120 (S12). The load information request is sent as an interrupt to the virtual machine 120. When receiving the load information request, the virtual machine 120 executes an interrupt handler (S13). The interrupt handler saves the state of cores including the core 101a existing immediately before the interrupt, in the RAM 104, and calls a desired program module. That is, a context switch occurs in the cores including the core 10a.

When the context switch is complete, the virtual machine 120 confirms the current load of the virtual machine 120 and sends load information indicating the current load to the virtual machine monitor 140 (S14). The load information is sent as an interrupt to the virtual machine monitor 140. When receiving the load information, the virtual machine monitor 140 executes an interrupt handler (S15). Then, the virtual machine monitor 140 re-computes the allocation of resources to the virtual machines 120 and 130 on the basis of the load information received from the virtual machine 120, and allocates resources to the virtual machines 120 and 130 (S16). At this time, the virtual machine monitor 140 recognizes that the load of the virtual machine 130 has not changed from the last confirmed load. Then, the virtual machine monitor 140 sets the timer 103 for the time period for collection of load information (S17).

Similarly, when the specified time period expires, the timer 103 issues a timer interrupt to the virtual machine monitor 140 (S18). The virtual machine monitor 140 executes an interrupt handler corresponding to the timer interrupt (S19). Then, the virtual machine monitor 140 sends a load information request to the virtual machine 130 (S20). When receiving the load information request, the virtual machine 130 executes an interrupt handler (S21). Then, the virtual machine 130 confirms the current load of the virtual machine 130 and sends load information indicating the current load to the virtual machine monitor 140 (S22).

When receiving the load information, the virtual machine monitor 140 executes an interrupt handler (S23). The virtual machine monitor 140 re-computes the allocation of resources to the virtual machines 120 and 130 on the basis of the load information obtained from the virtual machine 130, and allocates resources to the virtual machines 120 and 130 (S24). At this time, the virtual machine monitor 140 recognizes that the load of the virtual machine 120 has not changed from the last confirmed load. Then, the virtual machine monitor 140 sets the timer 103 for the time period for collection of load information (S25).

In the above process, the load information of a plurality of virtual machines is obtained at intervals, one at a time, and each time the load information of one virtual machine is obtained, the allocation of resources is re-computed. Alternatively, load information may be obtained from a plurality of virtual machines at a time, and the allocation of resources may be re-computed on the basis of the load information of the plurality of virtual machines. In this case, for example, the virtual machine monitor 140 sends a load information request to the virtual machine 130 immediately after the above step S12.

However, in the first method of FIG. 5, the processing time needed by an interrupt handler may be longer than that needed for intended process such as the confirmation of loads and the allocation of resources, which causes a high communication overhead between the virtual machine 120, 130 and the virtual machine monitor 140. For example, a context switch in an interrupt handler needs as long as 1 to 10 microseconds. However, the intended process such as the confirmation of loads needs only 0.1 to 1 microsecond.

Therefore, a long time lag exists between a load change in a virtual machine 120, 130 and an update of the resource allocation, which may not satisfy a resource demand of the virtual machine 120, 130 immediately. To deal with this, the second embodiment employs the following second method to monitor the loads of the virtual machines 120 and 130.

Figure 6:
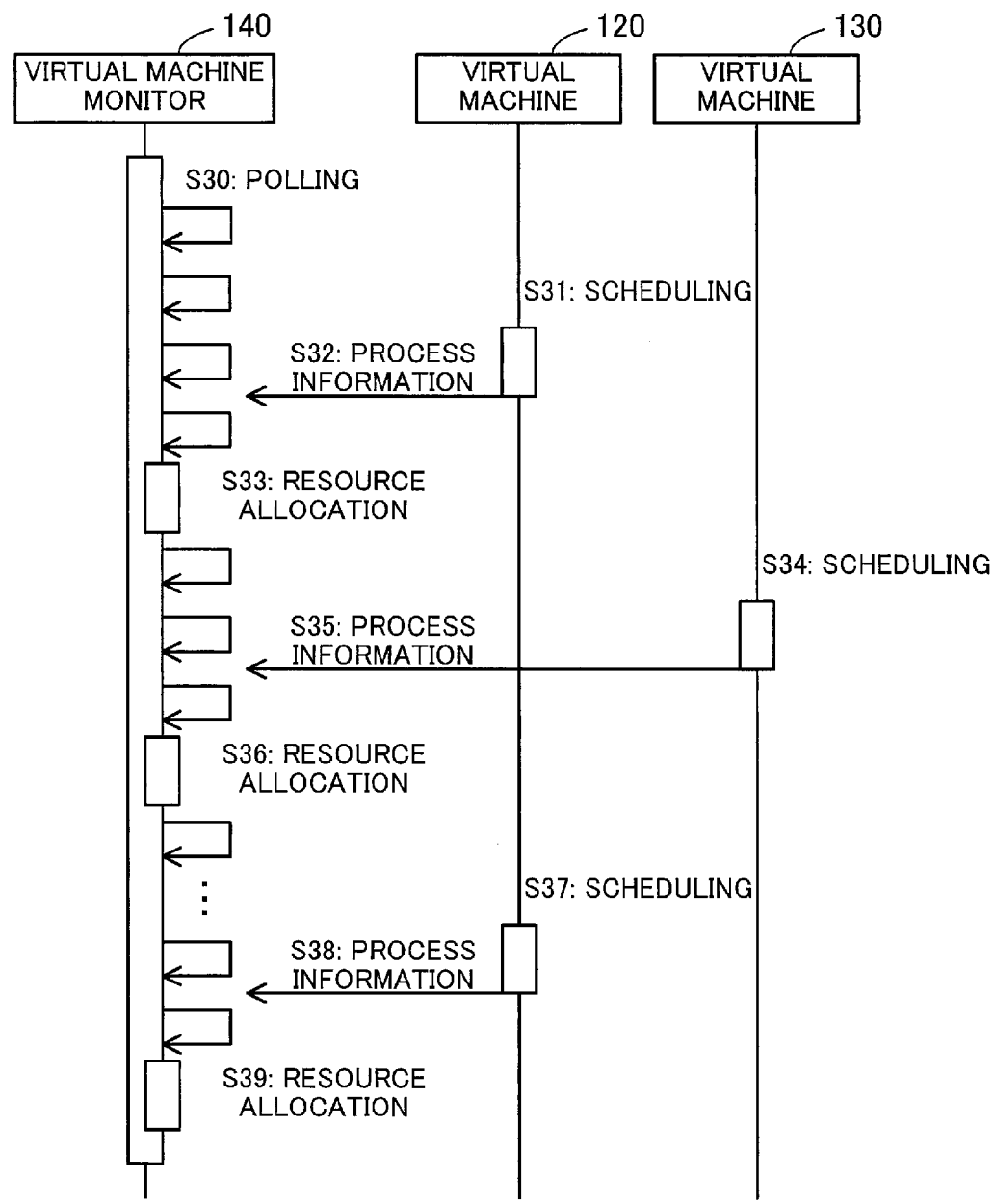
FIG. 6 is a sequence diagram illustrating a second exemplary flow of resource allocation.

FIG. 6 is a sequence diagram illustrating a second exemplary flow of resource allocation.

In the second method, the virtual machine monitor 140 reserves a shared area in the RAM 104 as will be described later. The shared area includes a space corresponding to the virtual machine 120 and a space corresponding to the virtual machine 130. The virtual machine monitor 140 monitors the shared area by polling at predetermined intervals (for example, at intervals of about 1 to 10 nanoseconds) (S30). For example, the virtual machine monitor 140 sequentially accesses a plurality of spaces in the shared area in one-time polling, and determines whether process information is stored in at least one space or not. The polling is performed periodically until process information is detected from at least one space.

For example, the virtual machine monitor 140 polls the shared area by executing a polling thread in parallel to other threads. For example, the polling thread repeats a process of reading from the shared area and if process information is not detected, going to sleep for a fixed time period, and then reading from the shared area again. This repetitive process may be implemented as a program including a loop, and does not need timer interrupts.

The operating system 122 of the virtual machine 120 schedules processes (S31). The scheduling time depends on a scheduling algorithm. For example, the operating system 122 performs the scheduling when a process currently being executed is completed or when a process currently being executed is interrupted by preemption. The scheduling involves updating the ready queue of processes. The virtual machine 120 generates process information based on the updated ready queue, and writes the process information in the space corresponding to the virtual machine 120 in the shared area (S32). The process information includes at least one of the number of waiting processes and an estimated maximum waiting time.

When detecting the process information from the space corresponding to the virtual machine 120 in the shared area, the virtual machine monitor 140 moves the process information from the space to another space in the RAM 104 to empty the space. Then, the virtual machine monitor 140 allocates resources to the virtual machines 120 and 130 on the basis of the process information of the virtual machine 120 (S33). At this time, the virtual machine monitor 140 recognizes that the execution waiting state of the virtual machine 130 has not changed from the last confirmed execution waiting state. For example, the virtual machine monitor 140 increases the CPU resources allocated to the virtual machine 120 if the number of waiting processes or the estimated maximum waiting time of the virtual machine 120 has increased.

In the virtual machine 130, the operating system 132 schedules processes (S34). For example, the operating system 132 performs the scheduling when the virtual machine 130 completes a process currently being executed or when the process currently being executed is interrupted by preemption. The virtual machine 130 generates process information based on the ready queue of the virtual machine 130, and writes the process information in the space corresponding to the virtual machine 130 in the shared area (S35). The process information includes at least one of the number of waiting processes and the estimated maximum waiting time of the virtual machine 130.

When detecting the process information from the space corresponding to the virtual machine 130 in the shared area, the virtual machine monitor 140 moves the process information from the space to another space in the RAM 104 to empty the space. Then, the virtual machine monitor 140 allocates resources to the virtual machines 120 and 130 on the basis of the process information of the virtual machine 130 (S36). At this time, the virtual machine monitor 140 recognizes that the execution waiting state of the virtual machine 120 has not changed from the last confirmed execution waiting state.

Then, in the virtual machine 120, the operating system 122 schedules processes (S37). The virtual machine 120 generates process information based on the ready queue, and writes the process information in the space corresponding to the virtual machine 120 in the shared area (S38). When detecting the process information from the space corresponding to the virtual machine 120 in the shared area, the virtual machine monitor 140 moves the process information from the space to another space in the RAM 104 to empty the space. The virtual machine monitor 140 allocates resources to the virtual machines 120 and 130 on the basis of the process information of the virtual machine 120 (S39).

In this connection, assume that intervals at which the virtual machine monitor 140 polls the shared area are sufficiently short compared with the frequency at which each virtual machine 120, 130 performs scheduling. In this case, it may be expected that the virtual machine monitor 140 detects the process information of only one virtual machine by performing polling once, and it is not needed to consider that the virtual machine monitor 140 detects the process information of two or more virtual machines in one-time polling.

Figure 7:
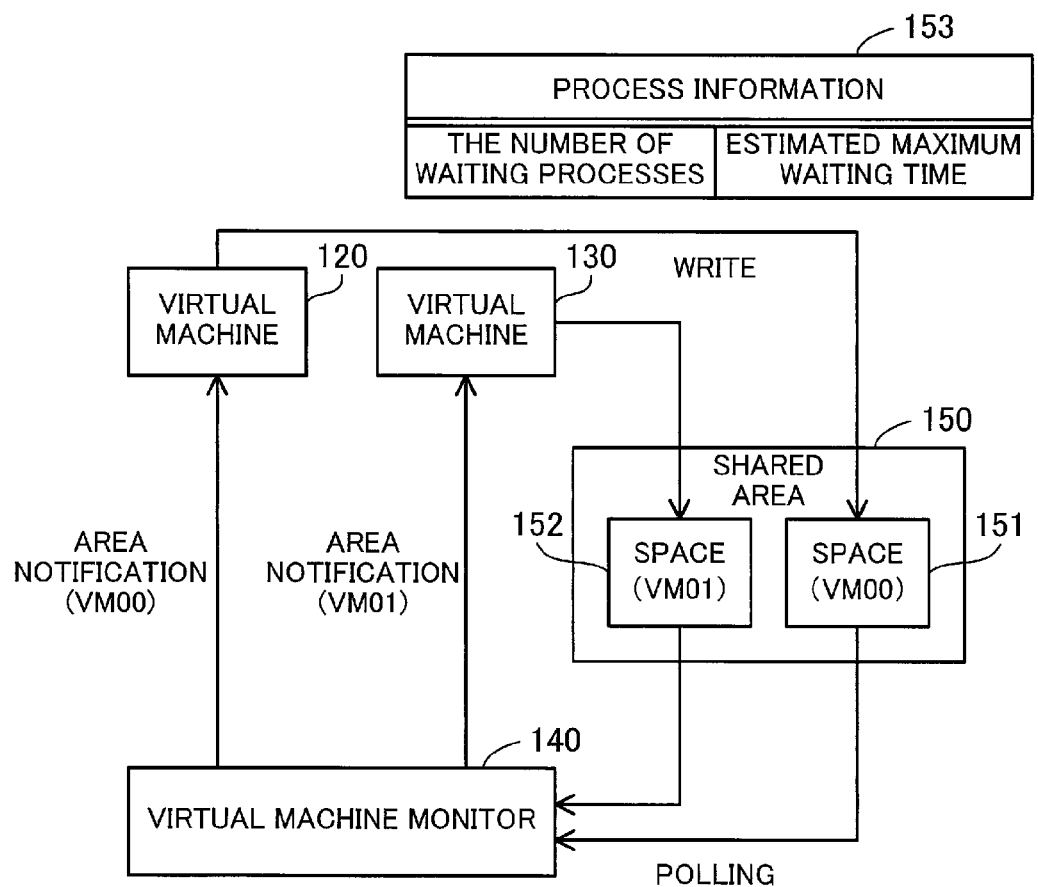
FIG. 7 illustrates an example of how to make a notification of process information.

FIG. 7 illustrates an example of how to make a notification of process information.

As described above, the virtual machine monitor 140 reserves the shared area 150 in the RAM 104. The shared area 150 is reserved, for example, when the virtual machine monitor 140 is activated and starts virtualization. The shared area 150 includes a space 151 corresponding to the virtual machine 120 and a space 152 corresponding to the virtual machine 130. The virtual machine monitor 140 notifies the virtual machine 120 of the address of the space 151. For example, when the virtual machine 120 is activated, the virtual machine monitor 140 makes this notification. In addition, the virtual machine monitor 140 notifies the virtual machine 130 of the address of the space 152. For example, when the virtual machine 130 is activated, the virtual machine monitor 140 makes this notification.

The virtual machine 120 generates process information 153 each time the virtual machine 120 schedules processes, and writes the process information 153 in the space 151 specified by the virtual machine monitor 140. The process information 153 includes the number of waiting processes and an estimated maximum waiting time, for example. Similarly, the virtual machine 130 generates process information each time the virtual machine 130 schedules processes, and writes the process information in the space 152 specified by the virtual machine monitor 140. The virtual machine monitor 140 polls the spaces 151 and 152 at predetermined intervals.

When reading the process information 153 from the space 151, the virtual machine monitor 140 determines that the virtual machine 120 corresponding to the space 151 has generated the process information 153. Then, the virtual machine monitor 140 stores the process information 153 and the identification information of the virtual machine 120 in association with each other in an area different from the shared area 150 in the RAM 104, and re-computes the allocation of resources to the virtual machines 120 and 130. In this connection, the process information 153 is an example of the process information 16 of the first embodiment.

Similarly, when reading process information from the space 152, the virtual machine monitor 140 determines that the virtual machine 130 corresponding to the space 152 has generated the process information. Then, the virtual machine monitor 140 stores the read process information and the identification information of the virtual machine 130 in association with each other in an area different from the shared area 150 in the RAM 104, and re-computes the allocation of resources to the virtual machines 120 and 130.

The following describes the function of dynamically allocating resources that the information processing apparatus 100 has.

Figure 8:
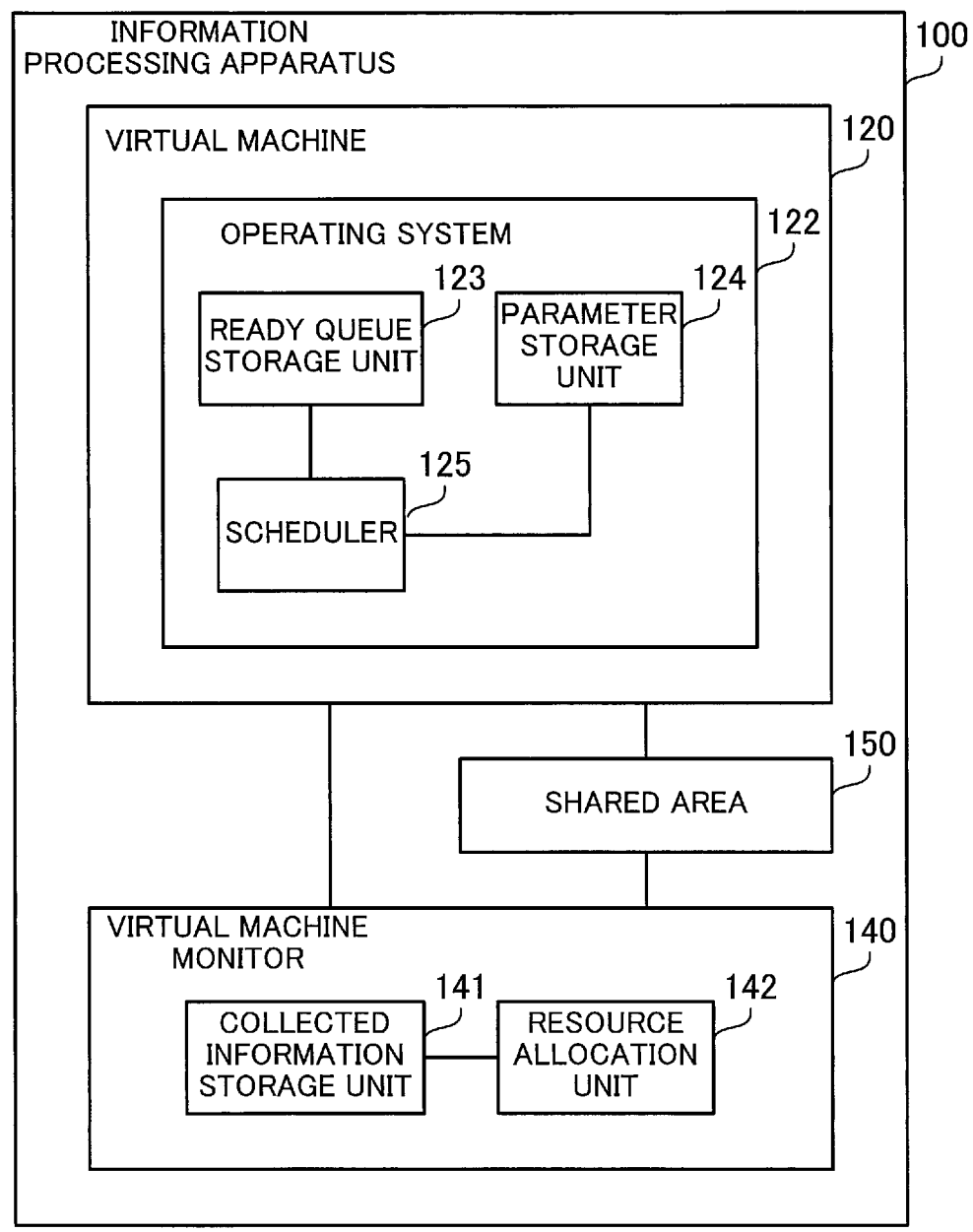
FIG. 8 is a block diagram illustrating a first exemplary function of the information processing apparatus.

FIG. 8 is a block diagram illustrating a first exemplary function of the information processing apparatus.

The virtual machine 120 includes the operating system 122, as described above. The operating system 122 includes a ready queue storage unit 123, a parameter storage unit 124, and a scheduler 125. The ready queue storage unit 123 and parameter storage unit 124 are implemented using partial storage space of the RAM 104, for example. The scheduler 125 may be implemented as a program module that is executed by a core, such as the core 101a, for example. The operating system 132 of the virtual machine 130 may be implemented with the same module configuration as the operating system 122.

The ready queue storage unit 123 stores information (for example, process ID) identifying waiting processes among processes started on the operating system 122. For example, the waiting processes are arranged in descending order of priority of execution. The "order of priority" is determined according to a scheduling algorithm. For example, in the case of the FIFO algorithm, processes started earlier are given higher priority, and are placed earlier in a ready queue.

The parameter storage unit 124 stores the values of parameters to be used to estimate a maximum waiting time. The parameters include an average time to be taken to move a process forward by one in a ready queue (move up the priority order by one), as will be described later. The values of the parameters may be defined by a user or measured by the user in advance, and then may be stored in the parameter storage unit 124. In addition, the values of the parameters may dynamically and continuously be calculated and updated by the scheduler 125 monitoring the execution states of processes.

The scheduler 125 schedules processes started on the operating system 122, and updates information about the ready queue stored in the ready queue storage unit 123. For example, when a process currently being executed is interrupted or completed, the scheduler 125 extracts a process with the highest priority, which is placed at the beginning of the ready queue. If the process currently being executed is interrupted before completed, the scheduler 125 places the interrupted process at the end of the ready queue. Then, the scheduler 125 causes a core, such as the core 101*a*, to cause a context switch to start to execute the process extracted from the ready queue.

In addition, the scheduler 125 generates process information 153 each time the scheduler 125 performs scheduling. At this time, the scheduler 125 counts the number of waiting processes with reference to the updated information about the ready queue stored in the ready queue storage unit 123. In addition, the scheduler 125 estimates a waiting time (estimated maximum waiting time) needed to start the process placed at the end of the ready queue, with reference to the updated information about the ready queue and the values of parameters stored in the parameter storage unit 124. The scheduler 125 then generates process information 153 including the number of waiting processes and the estimated maximum waiting time, and writes the process information 153 in the space 151 of the shared area 150 previously specified by the virtual machine monitor 140. In this connection, the process information 153 may include only one of the number of waiting processes and the estimated maximum waiting time.

The virtual machine monitor 140 includes a collected information storage unit 141 and a resource allocation unit 142. The collected information storage unit 141 may be implemented using partial storage space of the RAM 104, for example. The resource allocation unit 142 may be implemented as a program module that is executed by the core 102*a*, for example.

The collected information storage unit 141 stores process information obtained from individual virtual machines. The collected information storage unit 141 only needs to store latest process information (process information obtained last from each virtual machine) for each virtual machine.

The resource allocation unit 142 periodically polls the shared area 150. The resource allocation unit 142 accesses spaces corresponding to all virtual machines in the shared area 150 and reads data by performing polling once. When detecting process information from the data of any space, the resource allocation unit 142 identifies a virtual machine that has generated the process information, on the basis of the space. Then, the resource allocation unit 142 stores the read process information in the collected information storage unit 141 in association with the identification information of the identified virtual machine.

Each time process information is updated for one virtual machine, the resource allocation unit 142 determines which resources to allocate to each virtual machine, with reference to the process information of all the virtual machines stored in the collected information storage unit 141. For example, the resource allocation unit 142 determines the relative load of the virtual machine 120 among the virtual machines, in terms of at least one of the number of waiting processes and the estimated maximum waiting time. Then, the resource allocation unit 142 determines the amount of resources to be allocated to the virtual machine 120 on the basis of the relative load. To increase the amount of allocated resources, the resource allocation unit 142 allocates additional resources to the virtual machine 120. To reduce the amount of allocated resources, the resource allocation unit 142 releases some of the resources allocated to the virtual machine 120.

The shared area 150 is a storage space reserved by the virtual machine monitor 140 in the RAM 104. The shared area 150 includes a plurality of spaces respectively corresponding to a plurality of virtual machines. The virtual machine monitor 140 holds correspondence information between the addresses of spaces and the virtual machines. The shared area 150 is managed by and accessible to the virtual machine monitor 140. The shared area 150 is also accessible to the virtual machines 120 and 130. The virtual machines 120 and 130 are notified of the addresses of their accessible spaces by the virtual machine monitor 140.

FIG. 9 illustrates an example of a time estimate table.

A time estimate table 126 is stored in the parameter storage unit 124. The time estimate table 126 includes fields for "Process ID" and "Average Time". The "Process ID" field contains the identification information of individual processes. Processes to be started by the same program are given the same process ID, irrespective of their start times. Therefore, a substantial identity between a process and a process that previously operated in the same way is determined based on a process ID. The "Average Time" field contains the average value of time to be taken to move a process forward by one step in a ready queue, for each process having a different process ID.

The estimated maximum waiting time included in the process information 153 may be calculated from the length of the ready queue (the number of waiting processes) and the average time corresponding to the process placed at the end of the ready queue. For example, the scheduler 125 calculates, as the estimated maximum waiting time, the product of the length of the ready queue and the average time corresponding to the process placed at the end of the ready queue. As an example, assuming that the length of the ready queue of the virtual machine 120 is "3" and the process ID of the process placed at the end of the ready queue is "P02", the estimated maximum waiting time is calculated as T2×3 microseconds with reference to the example of FIG. 9.

FIG. 10 illustrates an example of a process information table.

A process information table 143 is stored in the collected information storage unit 141. The process information table 143 includes fields for "Virtual Machine ID", "Process Count", and "Estimated Maximum Waiting Time". The "Virtual Machine ID" field contains the identification information given to individual virtual machines including the virtual machines 120 and 130. The virtual machine ID of a virtual machine may be determined when the virtual machine is configured for the first time, for example. The "Process Count" field indicates the number of waiting processes for a corresponding virtual machine. The "Estimated Maximum Waiting Time" field contains the estimated value of waiting time needed to start the process placed at the end of the ready queue of a corresponding virtual machine.

The process information table 143 contains a virtual machine ID, the number of waiting processes, and an estimated maximum waiting time with respect to each of the virtual machines 120 and 130 running on the information processing apparatus 100. For example, assuming that the virtual machine 120 has a virtual machine ID of "VM00", a ready queue with a length of "C0", and a process with process ID of "P02" at the end of the ready queue, "VM00", "C0", and "T2×C0" are registered in association with each other with respect to the virtual machine 120 in the process information table 143.

Further, assuming that the virtual machine 130 has a virtual machine ID of "VM01", a ready queue with a length of "C1", and a process with process ID of "P01" at the end of the ready queue, "VM01", "C1", and "T1×C1" are registered in association with each other with respect to the virtual machine 130 in the process information table 143. In this connection, either one of the number of waiting processes and an estimated maximum waiting time may be registered.

The following describes a procedure performed by the information processing apparatus 100.

Figure 11:
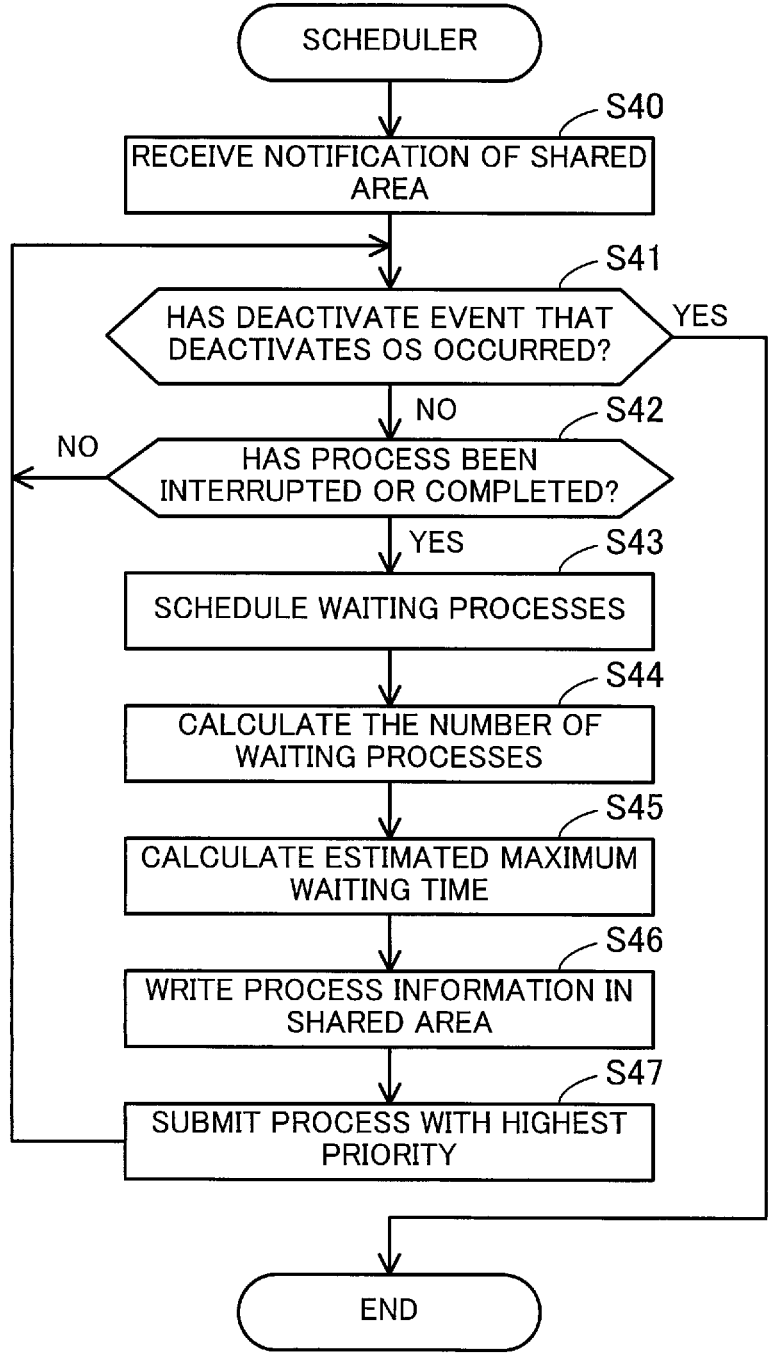
FIG. 11 is a flowchart illustrating an exemplary procedure of a scheduler.

FIG. 11 is a flowchart illustrating an exemplary procedure of a scheduler.

In this example, a procedure that is performed by the scheduler 125 of the virtual machine 120 will be described. The schedulers of the other virtual machines operate in the same way.

(S40) The scheduler 125 receives a notification of the shared area 150 from the virtual machine monitor 140. This notification includes the address of a space 151 corresponding to the virtual machine 120 among a plurality of spaces of the shared area 150.

(S41) The scheduler 125 determines whether a deactivate event that deactivates the operating system 122 has occurred. The deactivate event may be a user's input of a shutdown command to the operating system 122, for example. When such a deactivate event has occurred, the scheduler 125 completes this procedure. When no deactivate event has occurred, then the procedure proceeds to step S42.

(S42) The scheduler 125 determines whether a process currently being executed has been completed. In addition, the scheduler 125 determines whether the process currently being executed has been interrupted by preemption. If the process has been interrupted or completed, the procedure proceeds to step S43. If the process has not been interrupted or completed, the procedure proceeds to step S41.

(S43) When the process currently being executed has been interrupted, the scheduler 125 places the interrupted process at the end of the ready queue. Then, the scheduler 125 schedules the waiting processes placed in the ready queue. For example, the scheduler 125 extracts one process placed at the beginning of the ready queue, thereby determining what process to execute next. The scheduler 125 updates the information about the ready queue stored in the ready queue storage unit 123.

(S44) The scheduler 125 calculates the length of the ready queue, that is, the number of waiting processes with reference to the information about the ready queue stored in the ready queue storage unit 123.

(S45) The scheduler 125 calculates an estimated maximum waiting time with reference to the information about the ready queue stored in the ready queue storage unit 123 and the time estimate table 126 stored in the parameter storage unit 124. For example, the scheduler 125 searches the time estimate table 126 to find the average time corresponding to the process placed at the end of the ready queue, and calculates the product of the found average time and the number of waiting processes obtained at step S44, as the estimated maximum waiting time.

(S46) The scheduler 125 generates process information 153 including the number of waiting processes calculated at step S44 and the estimated maximum waiting time calculated at step S45. Then, the scheduler 125 writes the generated process information 153 in the space 51 of the shared area 150 specified by the virtual machine monitor 140 at step S40.

(S47) The scheduler 125 starts the process determined at step S43. More specifically, the scheduler 125 causes a core, such as the core 101a, to cause a context switch and to execute the extracted process. Then, the procedure proceeds to step S41.

Figure 12:
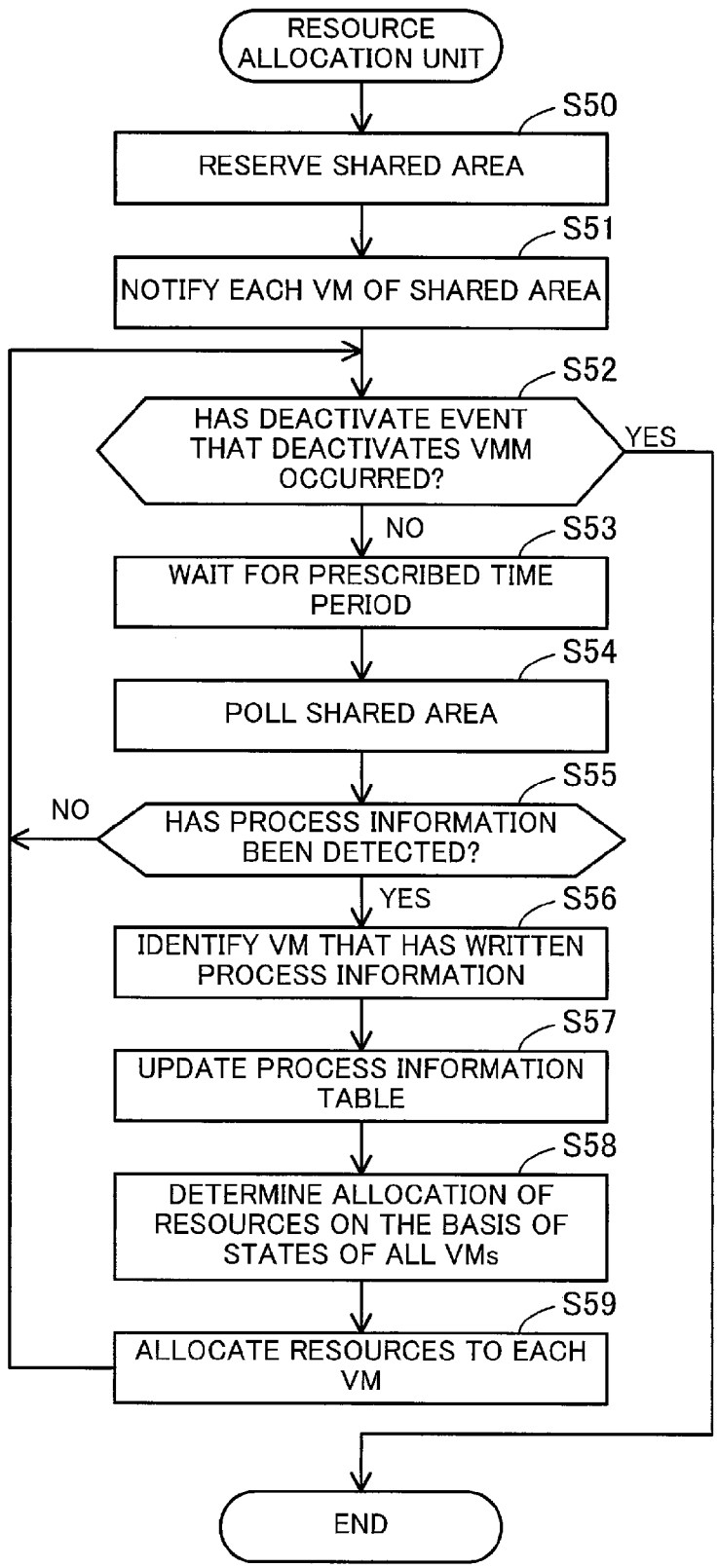
FIG. 12 is a flowchart illustrating an exemplary procedure of a resource allocation unit.

FIG. 12 is a flowchart illustrating an exemplary procedure of a resource allocation unit.

(S50) The resource allocation unit 142 reserves a shared area 150 in the RAM 104. In addition, the resource allocation unit 142 associates spaces 151 and 152 of the shared area 150 with virtual machines 120 and 130 that are activated on the information processing apparatus 100, respectively.

(S51) When the virtual machine 120 is activated, the resource allocation unit 142 notifies the virtual machine 120 of the shared area 150. The notification to the virtual machine 120 includes the address of the space 151. In addition, when the virtual machine 130 is activated, the resource allocation unit 142 notifies the virtual machine 130 of the shared area 150. The notification to the virtual machine 130 includes the address of the space 152.

(S52) The resource allocation unit 142 determines whether a deactivate event that deactivates the virtual machine monitor 140 has occurred. For example, deactivate events include an administrator's input of a stop command to power down the information processing apparatus 100, and an administrator's input of a shutdown command to the virtual machine monitor 140 to end the virtual environment. When such a deactivate event has occurred, the resource allocation unit 142 completes the procedure. When no deactivate event has occurred, the procedure proceeds to step S53.

(S53) The resource allocation unit 142 waits for a prescribed time period. For example, the prescribed time period indicates intervals for polling, and is set to 1 to 10 nanoseconds in advance.

(S54) The resource allocation unit 142 polls the shared area 150. In the polling, the resource allocation unit 142 sequentially accesses a plurality of spaces including the space 151 corresponding to the virtual machine 120 and the space 152 corresponding to the virtual machine 130.

(S55) The resource allocation unit 142 determines whether process information has been detected from any space of the shared area 150. If process information has been detected, the procedure proceeds to step S56. If no process information has been detected, the procedure proceeds to step S52.

(S56) The resource allocation unit 142 identifies a virtual machine that has written the process information, on the basis of the space from which the process information has been detected. For example, the resource allocation unit 142 determines that the process information relates to the virtual machine 120 when the process information has been detected from the space 151. The resource allocation unit 142 determines that the process information relates to the virtual machine 130 when the process information has been detected from the space 152.

(S57) The resource allocation unit 142 updates the process information table 143 stored in the collected information storage unit 141 on the basis of the process information detected at step S55. More specifically, the resource allocation unit 142 registers the number of waiting processes and estimated maximum waiting time included in the detected process information, in association with the virtual machine ID of the virtual machine identified at step S56 in the process information table 143. The number of waiting processes and estimated maximum waiting time may be saved with overwrite because only their latest values need to be held.

(S58) The resource allocation unit 142 determines the allocation of resources to the virtual machines 120 and 130 on the basis of the numbers of waiting processes and the estimated maximum waiting times of the virtual machines 120 and 130 registered in the process information table 143. For this allocation, the resource allocation unit 142 may use one of the number of waiting processes and the estimated maximum waiting time. For example, the resource allocation unit 142 determines the relative loads between the virtual machines 120 and 130 in terms of the number of waiting processes and the estimated maximum waiting time, and allocates more cores as CPU resources to a virtual machine with relatively higher load.

(S59) The resource allocation unit 142 allocates resources to the virtual machines 120 and 130 according to the resource allocation determined at step S58. Resources to be allocated include CPU resources. Not only CPU resources but also RAM resources and other resources may be included. Then, the procedure proceeds to step S52.

As described above, in the information processing apparatus 100 of the second embodiment, the virtual machine 120 writes process information indicating the number of waiting processes and an estimated maximum waiting time in the shared area 150 each time the operating system 122 of the virtual machine 120 schedules processes. In addition, the virtual machine 130 writes process information indicating the number of waiting processes and an estimated maximum waiting time in the shared area 150 each time the operating system 132 of the virtual machine 130 schedules processes. The virtual machine monitor 140 polls the shared area 150, and when detecting process information from the shared area 150, adjusts the allocation of resources to the virtual machines 120 and 130.

This approach makes it possible to reduce an overhead of an interrupt handler, compared with the case where the virtual machines 120 and 130 and the virtual machine monitor 140 communicate with each other using "interrupts". In addition, the virtual machines 120 and 130 present process information to the virtual machine monitor 140, which makes it possible to reduce onward communication requesting the process information, compared with the case where the virtual machine monitor 140 makes the request.

Therefore, it is possible to streamline the communication between the virtual machines 120 and 130 and the virtual machine monitor 140, and to adjust the allocation of resources to the virtual machines 120 and 130 immediately according to a change in the load of the virtual machines 120 and 130.

Further, in the second embodiment, process information is written in the shared area 150 at the time of each scheduling, and the shared area 150 is polled at sufficiently short intervals as compared with the intervals for the scheduling. Therefore, it is possible to sufficiently reduce a time lag between a change in the load of a virtual machine 120, 130 and a change in the resource allocation.

(Third Embodiment)

The following describes a third embodiment. Different features from the second embodiment will be mainly described, and the same features as the second embodiment will not be described. The second embodiment is designed to extend the functions of the scheduler 125 of the operating system 122 so as to write process information 153 in the shared area 150 at the time of each scheduling. On the other hand, the third embodiment is designed to write the process information 153 in the shared area 150 at the time of each scheduling, without modifying the operating system itself.

Figure 13:
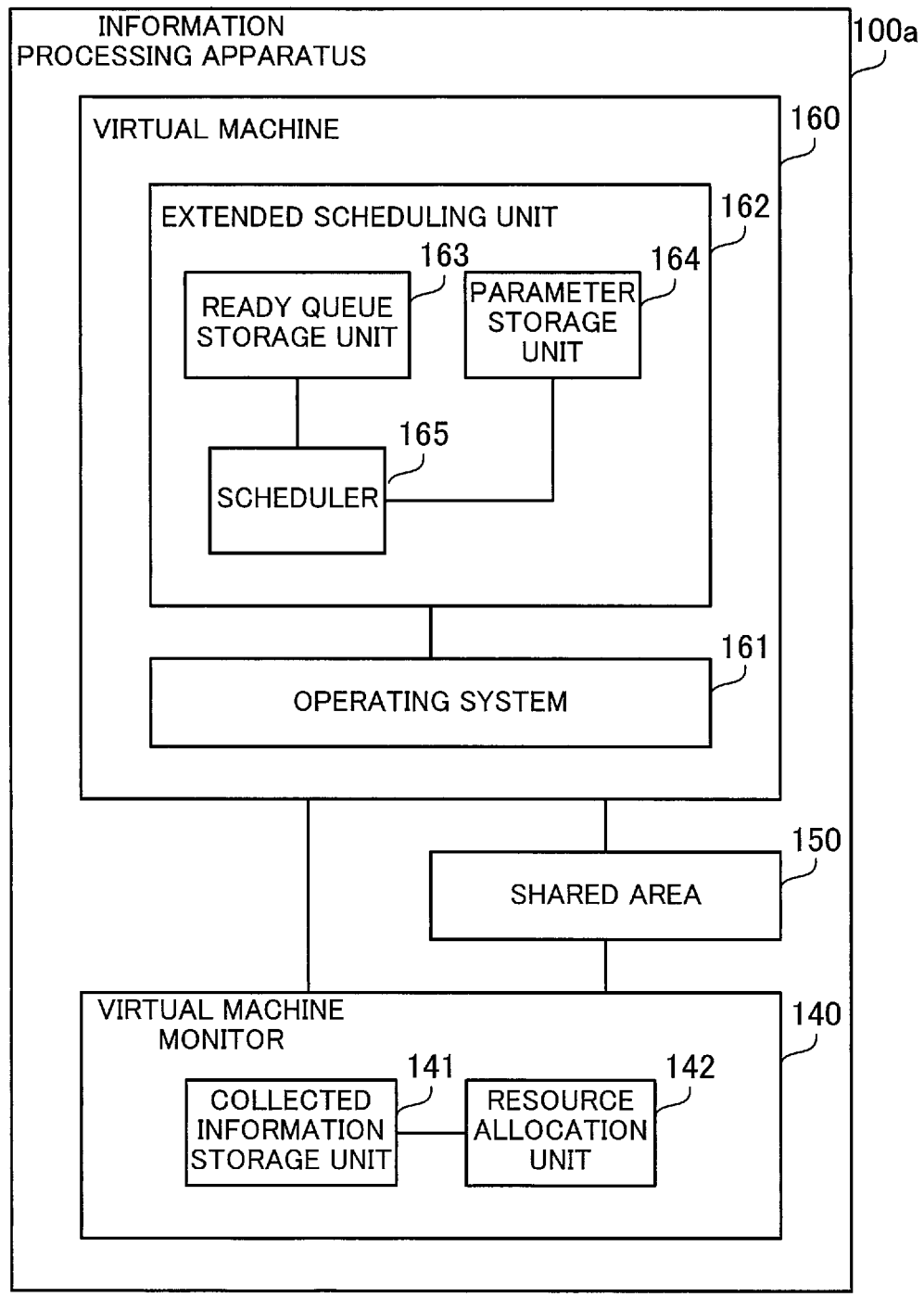
FIG. 13 is a block diagram illustrating a second exemplary function of the information processing apparatus.

FIG. 13 is a block diagram illustrating a second exemplary function of the information processing apparatus.

An information processing apparatus 100a of the third embodiment includes a virtual machine monitor 140, a shared area 150, and a plurality of virtual machines including a virtual machine 160. The virtual machine 160 includes an operating system 161 and an extended scheduling unit 162. The other virtual machines may be implemented with the same module configuration as the virtual machine 160.

The operating system 161 is a general operating system that does not have a function of outputting process information 153. The extended scheduling unit 162 is a software module that is externally attached to the operating system 161. The extended scheduling unit 162 is recognized as a single big process by the operating system 161. Threads are started from an application program on the extended scheduling unit 162. The extended scheduling unit 162 schedules these threads.

That is, the processes 121a, 121b, and 121c of the second embodiment correspond to threads to be scheduled by the extended scheduling unit 162. A scheduler in the operating system 161 controls the operation of the extended scheduling unit 162, and the extended scheduling unit 162 actually controls the execution of an application program. This makes it possible to implement a scheduling function different from the operating system 161, without modifying the scheduler within the operating system 161.

The extended scheduling unit 162 includes a ready queue storage unit 163, a parameter storage unit 164, and a scheduler 165. The ready queue storage unit 163 and parameter storage unit 164 correspond to the ready queue storage unit 123 and parameter storage unit 124 of the second embodiment, respectively.

The scheduler 165 starts threads from an application program on the extended scheduling unit 162, instead of starting processes from the application program on the operating system 161. The scheduler 165 schedules these threads and updates information about a ready queue stored in the ready queue storage unit 163. For example, the scheduler 165 rewrites an instruction address stored in a register that a core, such as the core 101a, has, to cause a pseudo context switch.

In addition, the scheduler 165 generates process information 153 each time the scheduler 165 schedules threads. At this time, the scheduler 165 counts the number of waiting processes with reference to the updated information about the ready queue stored in the ready queue storage unit 163. In addition, the scheduler 165 estimates a waiting time (estimated maximum waiting time) needed to start the thread placed at the end of the ready queue with reference to the updated information about the ready queue and the values of parameters stored in the parameter storage unit 164. The scheduler 165 then generates the process information 153 including the number of waiting processes and the estimated maximum waiting time, and writes the process information 153 in a space 151 of the shared area 150 previously specified by the virtual machine monitor 140.

The information processing apparatus 100a of the third embodiment produces the same effects as in the second embodiment. In addition, the third embodiment makes it possible to write the process information 153 in the shared area 150 at the time of each scheduling, without modifying a scheduler within the operating system 161. This reduces the implementation cost.

(Fourth Embodiment)

The following describes a fourth embodiment. Different features from the second embodiment will be mainly described, and the same features as the second embodiment will not be described. Similarly to the third embodiment, the fourth embodiment makes it possible to write processing information 153 in the shared area 150 at the time of each scheduling, without modifying the operating system itself.

Figure 14:
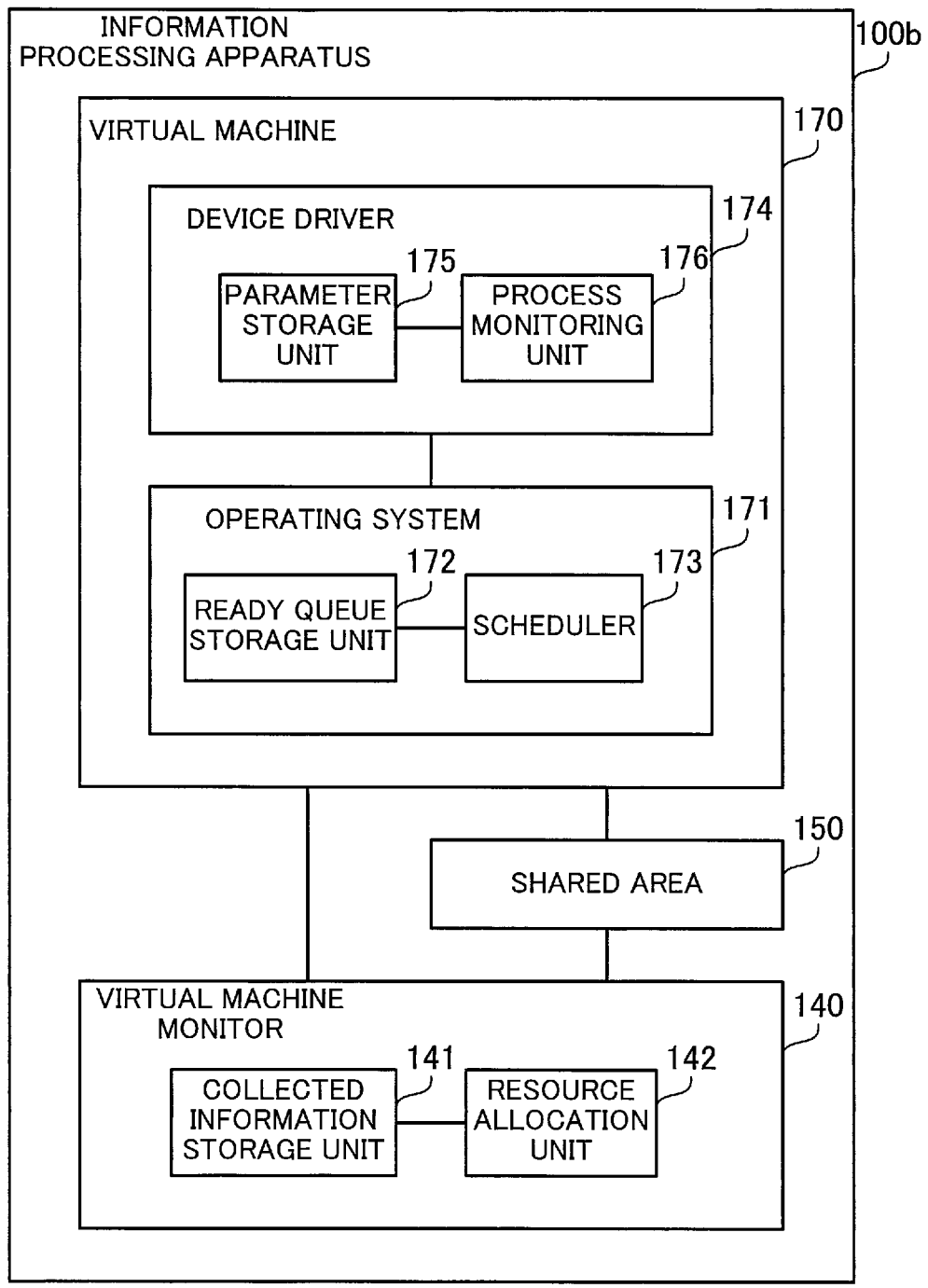
FIG. 14 is a block diagram illustrating a third exemplary function of the information processing apparatus.

FIG. 14 is a block diagram illustrating a third exemplary function of the information processing apparatus.

An information processing apparatus 100b of the fourth embodiment includes a virtual machine monitor 140, a shared area 150, and a plurality of virtual machines including a virtual machine 170. The virtual machine 170 includes an operating system 171 and a device driver 174.

The other virtual machines may be implemented with the same module configuration as the virtual machine 170.

The operating system 171 is a general operating system that does not have a function of outputting process information 153. The operating system 171 includes a ready queue storage unit 172 and a scheduler 173. The ready queue storage unit 172 corresponds to the ready queue storage unit 123 of the second embodiment. The scheduler 173 schedules processes started on the operating system 171, and updates information about a ready queue stored in the ready queue storage unit 172. The scheduler 173 causes a core, such as the core 101a, to cause a context switch to switch between processes for execution.

The device driver 174 is able to access the CPUs 101 and 102. The device driver 174 is activated on the operating system 171 according to the driver programs for the CPUs 101 and 102. The device driver 174 includes a parameter storage unit 175 and a process monitoring unit 176. The parameter storage unit 175 corresponds to the parameter storage unit 124 of the second embodiment. The process monitoring unit 176 may be implemented as a program module that is executed by a core, such as the core 101a, for example.

The process monitoring unit 176 continuously reads a predetermined register value from a core allocated to the virtual machine 170. The value to be read indicates the number of context switches that occurred in the core, and may be called Performance Monitoring Counter (PMC). The PMC value is stored in a special register different from a general register used for data processing. The core increments the PMC value each time a context switch occurs.

The process monitoring unit 176 determines whether there is a change in the PMC value read from the core. A change in the PMC value means that a context switch has occurred in the core and thus the scheduler 173 has scheduled processes. Therefore, each time the PMC value changes, the process monitoring unit 176 generates process information 153 and writes it in the shared area 150. This approach makes it possible to write the process information 153 in the shared area 150 at the time of each scheduling without modifying the scheduler 173.

When the PMC value changes, the process monitoring unit 176 obtains information about the ready queue stored in the ready queue storage unit 172, from the operating system 171. The process monitoring unit 176 counts the number of waiting processes on the basis of the obtained information about the ready queue. In addition, the process monitoring unit 176 calculates an estimated maximum waiting time on the basis of the obtained information about the ready queue and the values of parameters stored in the parameter storage unit 175. The process monitoring unit 176 then generates process information 153 including the number of waiting processes and the estimated maximum waiting time.

Figure 15:
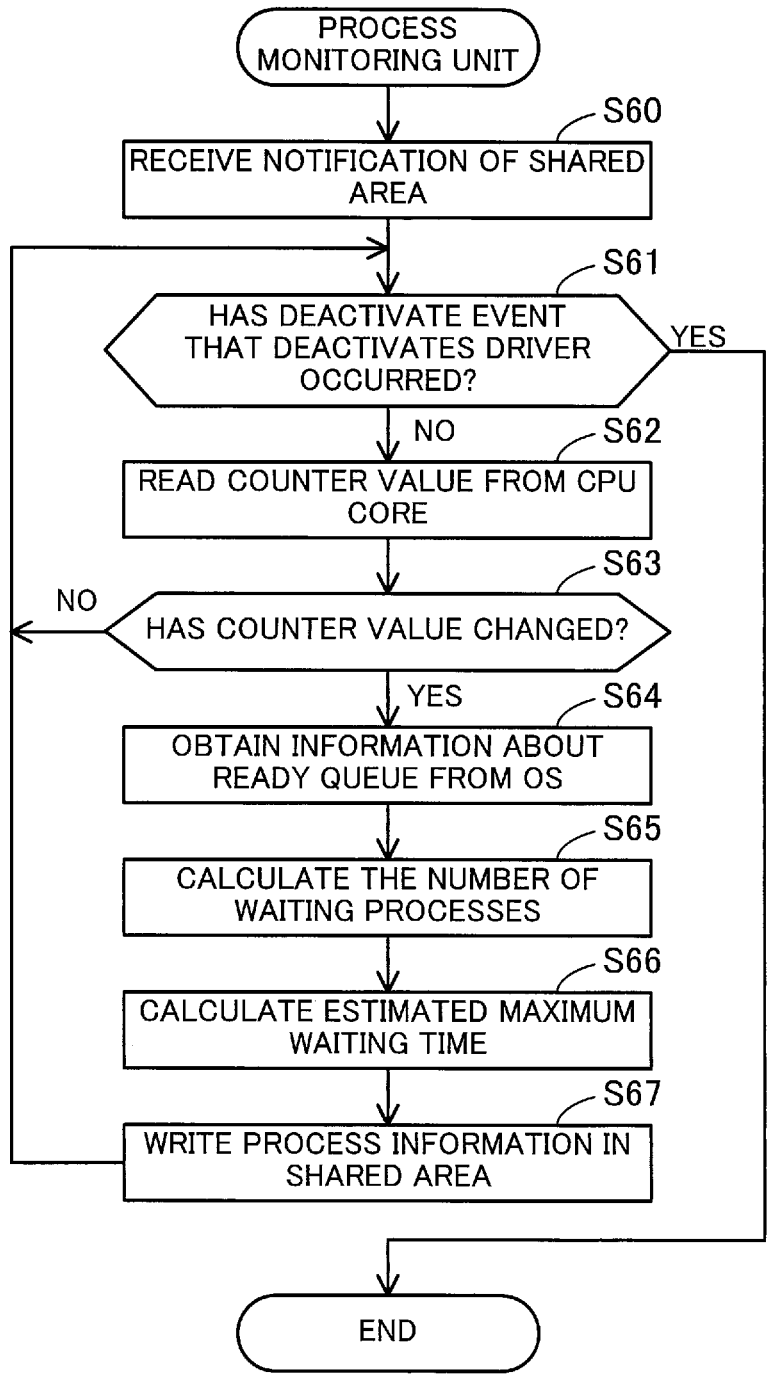
FIG. 15 is a flowchart illustrating an exemplary procedure of a process monitoring unit.

FIG. 15 is a flowchart illustrating an exemplary procedure of a process monitoring unit.

(S60) The process monitoring unit 176 receives a notification of the shared area 150 from the virtual machine monitor 140. This notification includes the address of a space 151 corresponding to the virtual machine 170 among a plurality of spaces of the shared area 150.

(S61) The process monitoring unit 176 determines whether a deactivate event that deactivates the device driver 174 has occurred. For example, deactivate events include a user's input of a shutdown command to the operating system 171. When such a deactivate event has occurred, the process monitoring unit 176 completes the procedure. When no deactivate event has occurred, the procedure proceeds to step S62.

(S62) The process monitoring unit 176 reads the value of the counter that counts the number of context switches from a core allocated to the virtual machine 170.

(S63) The process monitoring unit 176 determines whether the counter value read at step S62 has changed from the last value. If the counter value has changed, the procedure proceeds to step S64. If the counter value has not changed, the procedure proceeds to step S61.

(S64) The process monitoring unit 176 obtains information about the ready queue stored in the ready queue storage unit 172 from the operating system 171.

(S65) The process monitoring unit 176 calculates the length of the ready queue, that is, the number of waiting processes on the basis of the information about the ready queue obtained at step S64.

(S66) The process monitoring unit 176 calculates an estimated maximum waiting time on the basis of the information about the ready queue obtained at step S64 and a time estimate table 126 stored in the parameter storage unit 175. For example, the process monitoring unit 176 obtains the average time corresponding to the process placed at the end of the ready queue from the time estimate table 126 and calculates the product of the obtained average time and the number of waiting processes obtained at step S65 as the estimated maximum waiting time.

(S67) The process monitoring unit 176 generates process information 153 including the number of waiting processes calculated at step S65 and the estimated maximum waiting time calculated at step S66, and writes the generated process information 153 in the space 151 of the shared area 150 specified by the virtual machine monitor 140 at step S60. Then, the procedure proceeds to step S61.

The information processing apparatus 100b of the fourth embodiment produces the same effects as in the second embodiment. In addition, the fourth embodiment makes it possible to write the process information 153 in the shared area 150 at the time of each scheduling, without modifying the scheduler 173 of the operating system 171. In addition, the scheduler 173 of the operating system 171 is used without an additional scheduling function implemented independently, like the scheduler 165 of the third embodiment. This reduces the implementation cost.

In this connection, as described above, the information processing of the first embodiment may be achieved by the information processing apparatus 10 executing a program. The information processing of the second embodiment may be achieved by the information processing apparatus 100 executing a program. The information processing of the third embodiment may be achieved by the information processing apparatus 100a executing a program. The information processing of the fourth embodiment may be achieved by the information processing apparatus 100b executing a program.

Such a program may be recorded on a computer-readable recording medium (for example, recording medium 113). For example, recording media include magnetic disks, optical discs, magneto-optical discs, and semiconductor memories. Magnetic disks include FDs and HDDs. Optical discs include CDs, CD-Rs (Recordable), CD-RWs (Rewritable), DVDs, DVD-Rs, and DVD-RWs. In such a case, the program may be copied from a portable recording medium to another recording medium (for example, HDD 105) and then executed.

According to one aspect, it becomes possible to adjust the allocation of resources to virtual machines immediately.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a procedure comprising:
   reserving a storage area of a storage device provided in the computer by management software that manage a virtual machine running on the computer, and notifying the virtual machine of a location of the reserved storage area by the management software;
   detecting a waiting process on the virtual machine, the waiting process being ready for execution;
   writing process information about the detected waiting process by the virtual machine into the reserved storage area indicated by the location; and
   allocating resources to the virtual machine based on the process information stored in the reserved storage area.

2. The non-transitory computer-readable storage medium according to claim 1, wherein the process information includes one or both of a number of detected waiting processes and an estimated value of waiting time needed to execute the detected waiting process.

3. The non-transitory computer-readable storage medium according to claim 1, wherein the writing process information is performed when processes are scheduled by an operating system running on the virtual machine.

4. The non-transitory computer-readable storage medium according to claim 1, wherein:
   the procedure further includes monitoring a counter in a processor provided in the computer; and
   the writing process information is performed in response to a change in a value of the counter.

5. An information processing apparatus comprising:
   a storage device; and
   a processor that runs a virtual machine and management software that manage the virtual machine, wherein the processor is configured to perform a procedure including
      reserving a storage area of the storage device by the management software, and notifying the virtual machine of a location of the reserved storage area by the management software,
      detecting a waiting process on the virtual machine, the waiting process being ready for execution,
      writing process information about the detected waiting process by the virtual machine into the reserved storage area indicated by the location, and
      allocating resources to the virtual machine based on the process information stored in the reserved storage area.

6. An information processing system comprising:
   a storage device;
   a first processor that runs a virtual machine; and
   a second processor that executes management software for managing the virtual machine, wherein:
   the second processor reserves a storage area of the storage device and notifies the virtual machine of a location of the reserved storage area by the management software;
   the first processor detects a waiting process on the virtual machine and writes process information about the detected waiting process by the virtual machine into the reserved storage area indicated by the location, the waiting process being ready for execution; and
   the second processor monitors the reserved storage area, and upon detecting the process information from the reserved storage area, allocates resources to the virtual machine based on the process information.

* * * * *